United States Patent [19] [11] 4,154,673
Otani et al. [45] May 15, 1979

[54] METHOD OF TREATMENT OF WASTE WATER CONTAINING SULFUR COMPOUNDS

[75] Inventors: Kouji Otani; Shigeoki Nishimura; Toshio Sawa, all of Hitachi; Seiichi Kikkawa, Katsuta; Ikuo Shimokobe, Hitachi; Nobuo Yoshida, Kashiwa; Kosaku Otsubo, Tokyo; Tsukasa Nishimura, Kure, all of Japan

[73] Assignees: Hitachi, Ltd.; Hitachi Plant Engineering & Construction Co., Ltd.; Babcock-Hitachi K.K., all of Tokyo, Japan

[21] Appl. No.: 810,803

[22] Filed: Jun. 28, 1977

[30] Foreign Application Priority Data

Jun. 30, 1976 [JP] Japan ................................. 51/76395

[51] Int. Cl.² ............................................. B01D 15/06
[52] U.S. Cl. ..................................... 210/30 R; 55/73; 210/37 R
[58] Field of Search ............. 55/73; 210/26, 39, 30 R, 210/37 R

[56] References Cited

U.S. PATENT DOCUMENTS

| 2,341,907 | 2/1944 | Cheetham et al. ................. 210/37 R |
| 2,688,000 | 8/1954 | Kressman et al. ............. 210/37 R X |
| 3,232,867 | 2/1966 | Abrams ........................ 210/30 R X |
| 3,382,169 | 5/1968 | Thompson ..................... 210/37 R X |
| 3,420,773 | 1/1969 | Selmeczi ....................... 210/37 R X |
| 3,536,613 | 10/1970 | Kunin et al. .................. 210/37 R X |
| 3,661,775 | 5/1972 | Miyahara et al. ................. 210/37 R |
| 3,833,710 | 9/1974 | Deschamps et al. .......... 210/37 R X |

OTHER PUBLICATIONS

Yost et al., The Decomposition & Oxidation of Dithionic Acid, J. of Amer. Chem. Soc., vol. 49, 3/1927, pp. 703-707.

Primary Examiner—Robert H. Spitzer
Attorney, Agent, or Firm—Thomas E. Beall, Jr.

[57] ABSTRACT

Waste water issued from a wet type desulfurization apparatus and containing thionic acid ions is introduced into ion-exchange towers filled with weak-basic anion-exchange which has to effect anion exchange therein. The weak-basic anion-exchange resin which has adsorbed the thionic acid ions is desorbed by contacting an alkaline solution. The thionic acid ions included in the desorbing solution are decomposed by heating them in the presence of acid. A decomposed solution is issued out of the system after its neutralization.

7 Claims, 6 Drawing Figures

METHOD OF TREATMENT OF WASTE WATER CONTAINING SULFUR COMPOUNDS

BACKGROUND OF THE INVENTION

This invention relates to a method of treatment of waste water containing sulfur compounds such as thionic acid ions, particularly to a method of treatment of a blowdown water issued from a wet type desulfurization apparatus for waste flue gas.

Wet type desulfurization apparatus for the waste flue gas which use limestone slurry as an absorbent produce calcium sulfate ($CaSO_4$) as a by-broduct through a reaction of sulfur dioxides in the waste flue gas with the limestone slurry and an oxidation of its resulting product. The limestone slurry from which the $CaSO_4$ is separated is cyclicly used as the absorbent so that soluble impurities included in the limestone slurry and the waste flue gas are condensed in slurry during its recirculation. Therefore, it is necessary to blow off a part of the slurry as a blowdown water. In the blowdown water, substances contributing to COD (chemical oxygen demand), such as thionic acid ions are included and the COD is raised through recirculation of the slurry, so that the blowdown water can not be issued out of the wet type desulfurization apparatus without suitable treatment.

It is known that dithionic acid ions are decomposed by heating them in an acid solution. By simple application of the method to the treatment of the blowdown water, however, the substances can not be effectively and economically treated, because the content of the substances varys according to the length of times of the circulation, concentration of the sulfur dioxide and kinds of compositions and quantities of dust included in the waste flue gas, and the COD also varys.

Accordingly it is desirable to provide a method such that the substances contributing to the COD can be effectively and economically decomposed and the blowdown can be issued.

SUMMARY OF THE INVENTION

An object of the invention is to provide a method of treatment of waste water containing sulfur compounds such as thionic acid ions, wherein the sulfur compounds can be effectively and economically decomposed thereby providing an innoxious waste water.

Another object of the invention is to provide a method of treatment of waste water issued from a wet type desulfurization apparatus, wherein the waste water can the effectively and economically decomposed into innoxious material to be issued without exhaust of any noxious gas into the atmosphere.

Briefly stated, a feature of the invention comprises steps of effecting ion-exchange by introduction of waste water to weak-basic anion-exchange resin, regeneration of the anion-exchange resin by contacting the anion-exchange resin with a regenerating solution, whereby the sulfur compounds are desorbed from the anion-exchange resin, and decomposing the sulfur compounds by heating the sulfur compounds while keeping the same in a range of low pH value.

DESCRIPTION OF THE PREFERRED EMBODIMENT

The present invention is directed to treatment of waste water containing sulfur compounds such as thionic acid ions. As an example of waste water, a blowdown water issued from a wet desulfurization apparatus for waste flue gas which uses limestone as an absorbent of $SO_2$ and produces calcium sulfate as a by-product, is known.

Figure 1:
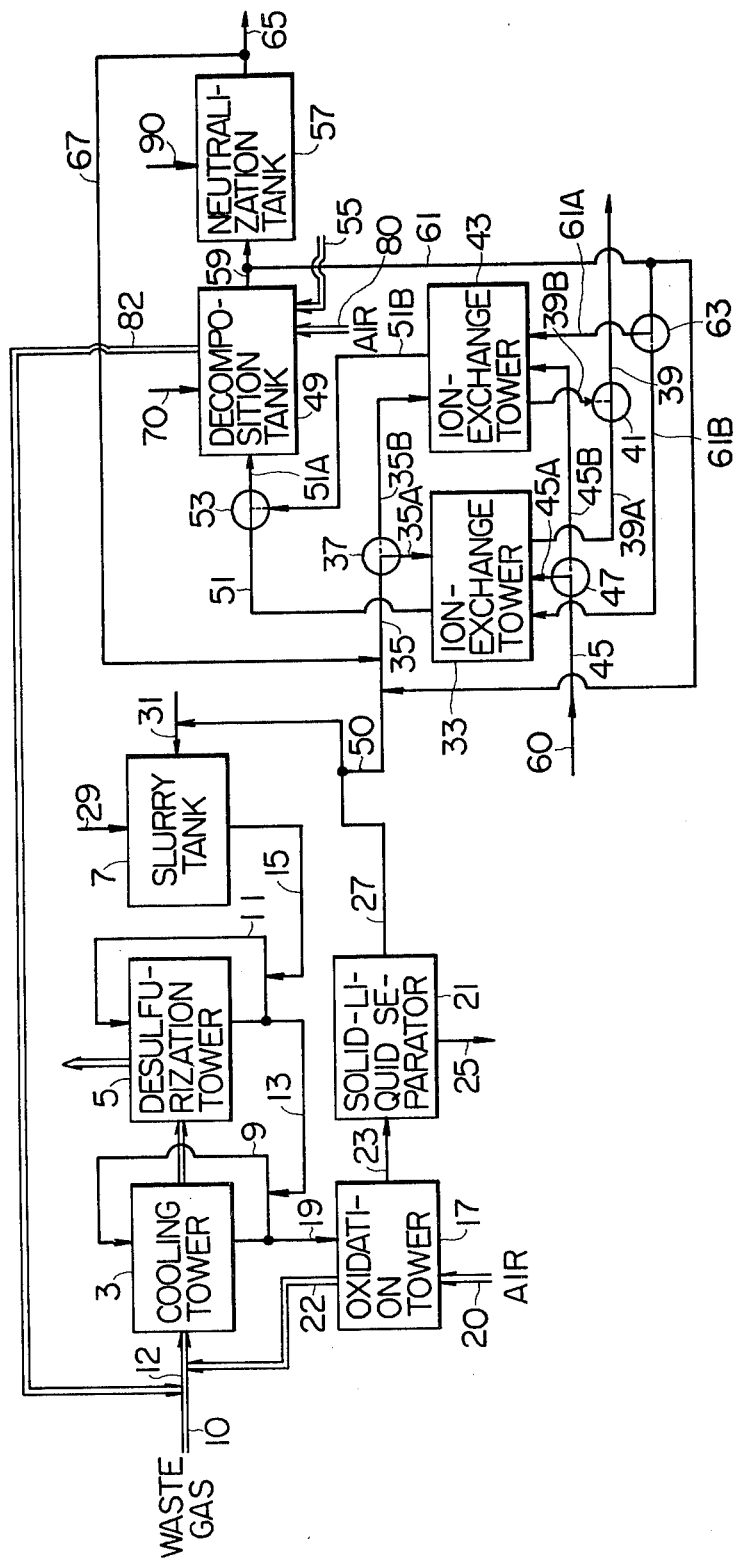
FIG. 1 is a schematic diagram showing a waste water treatment system including a wet type desulfurization apparatus according to the present invention.

Before the description of an embodiment of the present invention, the wet desulfurization apparatus and compositions of the blowdown water issued therefrom will be described referring to FIG. 1. In FIG. 1, a waste flue gas 10 including sulfur dioxides is introduced into a cooling tower 3 and a desulfurization tower 5 in turn and exhausted out of the apparatus through a duct 12, while limestone slurry from a slurry tank 7 is supplied to each of the desulfurization tower 5 and the cooling tower 3 through a passage 15, a circulation passage 11, a passage 13 and a circulation passage 9, so that the dioxides in the waste flue gas contact and react with the limestone slurry circulating and are absorbed in form of $CaSO_3$ in the limestone slurry. Part of the limestone slurry including $CaSO_3$ is delivered to an oxidation tower 17 through a passage 19. The $CaSO_3$ is oxidized by air 20 introduced into the oxidation tower 17 through a duct 22, which results in production of calcium sulfate ($CaSO_4$) in the limestone slurry. The limestone slurry is further delivered to a solid-liquid separator 21 through passage 23, wherein the calcium sulfate is separated from the limestone slurry and put out of the apparatus from an outlet 25 as a by-product. The limestone slurry is returned as a circulation solution to the slurry tank 7 through a passage 27. Limestone and water corresponding to consumption of the limestone slurry are supplied to the slurry tank 7 from inlets 29 and 31, respectively. Part of the circulation solution is blown off as a blowdown water or waste water 50 from a part of the passage 27.

The blowdown water 50 includes the following anions:

Table 1

| Composition (%) | | | | | CODcr |
|---|---|---|---|---|---|
| $SO_4^{2-}$ | $S_2O_6^{2-}$ | $S_4O_6^{2-}$ | $S_5O_6^{2-}$ | $Cl^-$ | (ppm) |
| 0.95 | 0.45 | 0.01 | 0.03 | 0.12 | 500 | note:
CODcr is one measured according to JIS (Japanese Industrial Standard), using $K_2Cr_2O_7$.

From the table 1, it is noted that the blowdown water includes substances contributing to chemical oxygen demand (COD), that is sulfur compounds such as thionic acid ions ($S_2O_6^{2-}$, $S_4O_6^{2-}$ and $S_5O_6^{2-}$) and the COD of the blowdown water is about 500 ppm. The COD is necessary to be reduced to a value at which is permitted for the blowdown water, for example 30 ppm.

Next, an embodiment of the present invention for COD reduction of the waste water such as the blowdown water will be described. The present invention includes a first step of effecting anion exchange between the thionic acid ions included in the blowdown water and weak-basic anion-exchange resin (hereinafter simply called the resin), a second step of desorption of the thionic acid ions from the resin so that the resin will be regenerated, and decomposition of the thionic acid ions.

In the first step, the following resins can be preferably used as the resin:

Table 2

| Trade Name of Resin | Maker | Exchange Radical | Exchange Capacity ($g^{-eq}$/l-resin) |
|---|---|---|---|
| DIATON WA-20 | Mitubishi | —$NH_2$ | (2.2) |
| DIATON WA-30 | — | —$N(CH_3)_2$ | (1.3) |
| AMBERLITE IR-45 | Rohm & Haas | —$N(R)_2$ —$NH(R)$ —$NH_2$ | (1.7) |
| AMBERLITE | " | —$N(CH_3)_2$ | (1.0) |
| DOWEX WGR | Dow Chemical | —$N(R)_2$ —$NH(R)$ —$NH_2$ | (0.95) |

Figure 2:
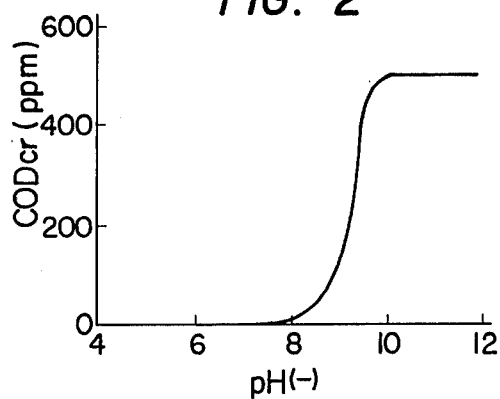
FIG. 2 is a graph showing the relation between pH of and COD of a solution being treated through anion exchange.
Figure 5:
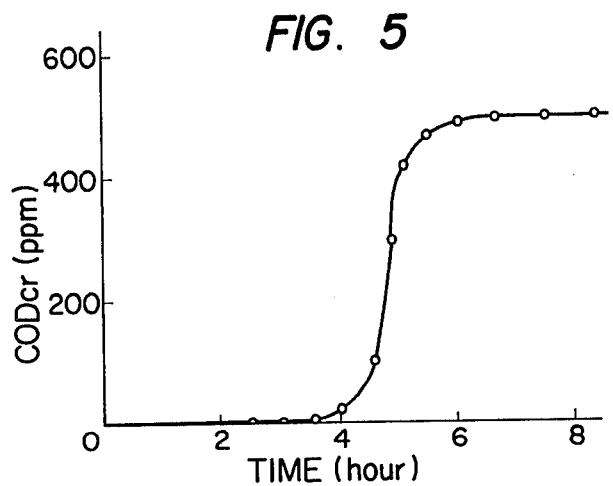
FIG. 5 is a graph showing the relation between COD and time when anion exchange is effected.

Referring to FIG. 2, there is shown a result, wherein the blowdown water of the COD of 500 ppm is treated by the anion exchange at various values of pH. It is noted that the COD is enoughly reduced at a pH of at most 8 (pH ≦ 8). Under the condition of pH 8, the resin effects selectively the anion exchange with the thionic acid ions in preference to the other anions such as $SO_4^{2-}$, $Cl^-$ etc. Capacity for the anion exchange of the resin with the thionic acid ions is nearly equal to that with $Cl^-$. The capacities for the anion exchange of the resins with the dithionic acid ions ($S_2O_6^{2-}$) are shown in brackets of the Table 2. In FIG. 5, there is shown a treatment result of the blowdown water which is shown as a relation of the COD to time of the treatment of the blowdown water. From the FIG. 5, it is noted that if the COD at which the blowdown water can be issued out of the system is about 30 ppm, the capacity of the anion exchange till the blowdown water reaches the COD of 30 ppm becomes about 90% of its equilibrium value.

In the second step, the desorption is effected by keeping the resin adsorbing the thionic acid ions in a desorbing or regenerating solution of pH of at least 10 (pH ≧ 10), that is the resin is regenerated with the thionic acid ions being desobed from the resin. The range of the pH of the regenerating solution including the resin is determined from an experimental results shown in FIG. 3, which shows a relation between a rate of regeneration of the resin and the pH of the solution used in the desorption. The desorption was effected under the conditions that the blowdown water was removed from the above-mentioned desulfurization apparatus and treated through the anion exchange at a pH of 6, and at a ratio given as follows;

$$\frac{\text{amount of the blowdown water}}{\text{amount of the resin}} = 20 \text{ (wt)}$$

Figure 3:
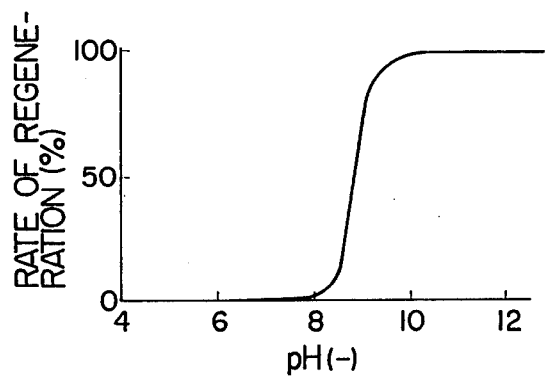
FIG. 3 is a graph showing the relation between a rate of regeneration and pH when the regeneration is effected.

From the FIG. 3, it is noted that the desorption starts to be effected at a pH of about 8, and the rate of the decomposition reaches to about 95% at a pH of about 10. The COD of the regenerating solution increased to 5,000 ppm, that is the regenerating solution were condensed to 10 times with respect to the thionic acid ions, as compared with the blowdown water.

In the third step, the decomposition of the thionic acid ions in the regenerating solution is effected by heating it in the presence of acid, for example the dithionic acid ions are decomposed as follows;

$$S_2O_6^{2-} \rightarrow SO_4^{2-} + SO_2$$

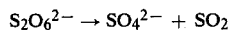

The sulfur dioxide $SO_2$ produced through the decomposition step can be removed by the desulfurization apparatus.

Figure 4:
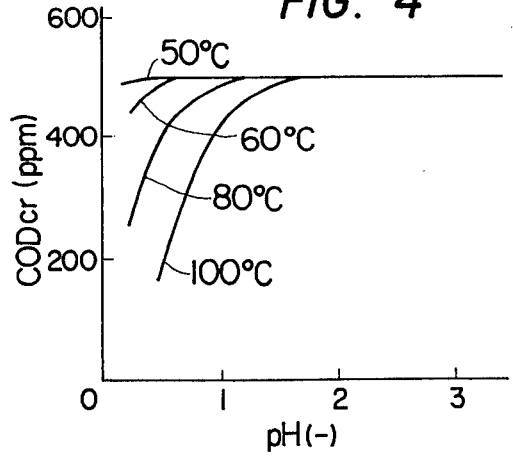
FIG. 4 is graph showing a relation COD and pH when thionic acid ions are decomposed.
Figure 6:
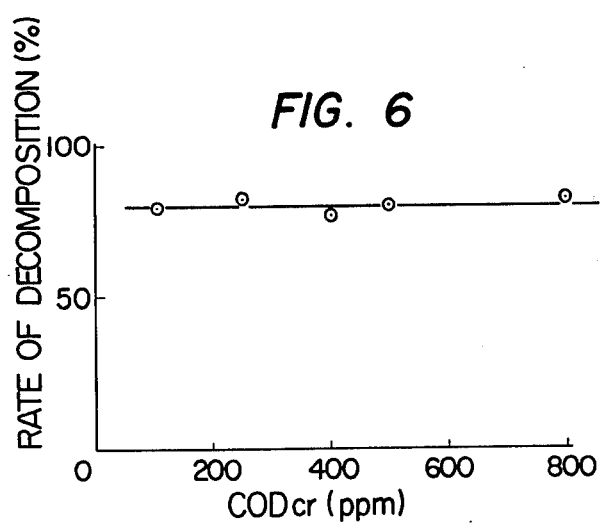
FIG. 6 is a graph showing the relation between a rate of decomposition and COD when thionic acid ions are decomposed.

In FIG. 4, a relation between a pH and COD of a solution including the thionic acid ions is shown, using the parameter of temperature. As apparent from the FIG. 4, it is noted that in a range of pH of not more than 1.5 (pH ≦ 1.5) and in a range of temperature of more than about 60° C. the COD is reduced, that is the decomposition of the thinoic acid ions is effected. In FIG. 6, there is shown a relation between a rate of the decomposition and COD of the regeneration solution where the decomposition is effected for a fixed time at a pH of 0.5 and a heating temperature of 90° C. It is apparent from the FIG. 6 that the rate of the decomposition is kept approximately constant irrespectively of the concentration of the COD, and the higher the concentration of the COD is, the larger the amount of the decomposition becomes. Therefore, in order to effectively decompose the thionic acid ions, it is necessary that they be condensed before the decomposition, whereby both the capacity of the decomposition tank and the amount of acid used for the decomposition can be decreased.

Further, the embodiment of the present invention will be described hereinafter referring back to FIG. 1.

The blowdown water 50 blown off from the passage 27 is introduced into an ion-exchange tower 33 filled with weak-basic anion-exchange resin through passage 35 and 35A with a changeover valve 37 being operated such that the passages 35 communicates with the passage 35A, so that anion exchange between the resin and the thionic acid ions is effected. The blowdown water from which the thionic acid ions are removed through the anion exchange is issued out of the system through a passage 39B, a change-over valve 41 and a passage 39. An operation time, that is a time length in which the anion exchange can be effected, is determined such that the COD of the blowdown water reaches less than a concentration at which the blowdown water can be issued out of the system, for example 30 ppm. After the operation time has been elapsed, the changeover valves 37 and 41 are switched such that the passages 35 and 39A communicate with passages 35B and 39B, respectively, so that another part of the blowdown water 50 is introduced into an ion-exchange tower 43 which is the same in its instruction as the ion-exchange tower 33, and issued out of the system, whereby the anion exchange is effected in the ion-exchange tower 43 in the same manner as in the ion-exchange tower 33.

Regeneration of the resin filled in the ion-exchange tower 33 is carried out repeatedly by introducting as a regeneration or desorbing solution, a NaOH solution 60 into the ion-exchange tower 33 through passages 45 and 45A with a changeover valve 47. In the regenerating solution the thionic acid ions are desorbed from the resin and condensed. The regenerating solution including the thionic acid ions desorbed is delivered to a decomposition tank 49 through passages 51 and 51A, with a changeover valve 53 operated to communicate the former 51 with the latter 51A. The regeneration of the ion-exchange tower 33 is carried out while effecting the anion exchange in the ion-exchange tower 43. After effecting the anion exchange in the ion-exchange tower 43 for a predetermined time, the regeneration of the tower 43 is effected in the same manner as in the tower 33.

The regenerating solution delivered to the decomposition tank 49 is adjusted to a pH of at most 1.5 (pH $\leq$ 1.5) by addition of a sulfuric acid ($H_2SO_4$) 70 and then heated to a temperature of above 60° C. with a low pressure steam 90 being admitted therein or another heat source, so that the thionic acid ions are decomposed. A small amount of air 80 is introduced into the decomposition tank 49, whereby the sulfur dioxide resulting from the decomposition is discharged along with the air out of the decomposition tank. The sulfur dioxide discharged is returned to the passage 12 through a passage 55 so that it can be desulfurized in the desulfurization tower 5. A decomposition solution which the regenerating solution formed through the addition of the alkaline solution in the decomposition tank 49 is delivered to a neutraligation tank 57 through a passage 59, neutralized through reaction with NaOH 90 added therein, and issued out of the system through a passage 65.

In the step of the regeneration of the resin, the resin regenerated is made into $OH^-$ type, accordingly the interior of the ion-exchange tower 33, 43 also is converted into an alkaline atmosphere. Therefore, even if the blowdown water is introduced into the ion-exchange tower 33, 43, the anion exchange is not effected until the pH of the atmosphere in the ion-exchange tower 33 or 43 reaches below 8. In such a case, it is preferred that part of the decomposition solution in the decomposition tank 49 be supplied to the ion-exchange tower 33 or 43, through a passage 61, a changeover valve 63, and a passage 61A or 61B directly after the regeneration of the resin, so that the resin can be changed from $OH^-$ type to $SO_4^-$ type and the pH of the atmosphere in the ion-exchange tower 33, 43 can changed to below 8.

In order to increase the rate of the decomposition of the thionic acid ions, it is preferabbe that COD of the neutralized solution is set to a value which is larger than a limit value at which the neutralized solution can be issued out of the system, and part of the neutralized solution in the passage 65 is extracted so that the COD of the neutralized solution issued will be smaller than the limit value. The extracted part of the neutralized solution is returned to the ion-exchange tower 33 through passage 67, 35, 35A to effect the anion exchange therein. Thus, the concentration of the decomposition solution in the decomposition tank 49 with respect to the thionic acid ions is kept relatively higher so that the thionic acid ions are effectively decomposed.

When the pH of the blowdown water 50 is above 8, a part of the decomposition solution is introduced into the blowdown water to reduce the pH to below 8, so that an amount of acid used for adjustment of pH can be decreased.

The method of treatment of the waste water according to the present invention can be applied to the other waste water containing sulfur compounds such as thionic acid ions than the blowdown water issued from the wet desulfurization apparatus.

What is claimed is:

1. A method of treatment of a waste water containing dithionic acid ions, using weakly-basic anion exchange resin, which method comprises the steps of
   selectively effecting anion exchange with dithionic acid in a range of pH of at most 8 by introducing the waste water to the weakly-basic anion-exchange resin;
   desorbing the dithionic acid ions from the weakly-basic anion-exchange resin by keeping a desorbing solution surrounding the weakly-basic anion-exchange resin in a range of a pH of at least 10 so that regeneration of the weakly-basic anion-exchange resin can be effected; and
   decomposing the desorbed dithionic acid ions by adjusting the pH of the desorbing solution containing the dithionic acid ions to at most 1.5 and heating the same to a temperature of at least 60° C. so that the dithionic acid ions are decomposed and a decomposition solution is formed.

2. The method as defined in claim 1, further including a step of introducing a part of the decomposition solution into the waste water so that a pH of the waste water can be adjusted to at most 8.

3. The method as defined in claim 1, further including a step of introducing a part of the decomposition solution to the weakly-basic anion-exchange resin after its regeneration so that the weakly-basic anion-exchange resin can be changed from $OH^-$ type to $SO_4^-$ type.

4. The method as defined in claim 1, further including a step of neutralization of the decomposition solution.

5. The method defined in claim 4, further including a step of introducing a part of the decomposition solution after its neutralization into the waste water being introduced to the weakly basic anion-exchange resin so that the concentration of dithionic acid included in the remaining decomposition solution after the neutralization will be a predetermined value, whereby the decomposition of the dithionic acid will be effected at a higher concentration.

6. The method as defined in claim 1, wherein a rate of the decomposition of the dithionic acid ions in the step of the decomposition is determined such that COD of the decomposition solution after its neutralization and before its issue is larger than a limit value at which the decomposition solution neutralized can be issued, and a part of the neutralized decomposition solution is introduced into the waste water.

7. A method of treatment of blowdown water including dithionic acid ion issued from a wet type desulfurization apparatus, using an ion-exchange tower filled with weakly-basic anion-exchange resin, which method comprises the steps of;
   introducing the blowdown water into the ion-exchange tower while issuing the blowdown water from which the dithionic acid ions are removed as effluent; selectively effecting anion exchange with the dithionic acid;
   introducing a desorbing solution into the ion-exchange tower so that the desorbing solution surrounding the weakly-basic anion-exchange resin can be kept at a pH of at least 10, for desorbing the dithionic acid ions from the weakly-basic anion-exchange resin;
   adjusting the pH of the desorbing solution passed through the ion-exchange tower to at most 1.5;

heating the desorbing solution to a temperature of at least 60° C. so that the dithionic acid ions are decomposed to sulfur dioxides;
introducing a part of a decomposition solution into the ion-exchange tower for substituting the weakly-basic anion-exchange resin therewith;
introducing sulfur dioxides produced in the step of decomposition into the wet type desulfurization apparatus;
neutralizing the decomposition solution; and
introducing a part of the neutralized decomposition solution into the ion-exchange tower.

* * * * *